(12) United States Patent
Kim

(10) Patent No.: US 11,600,823 B2
(45) Date of Patent: Mar. 7, 2023

(54) BINDER FOR SECONDARY BATTERY ELECTRODE, SECONDARY BATTERY ELECTRODE AND SECONDARY BATTERY INCLUDING SAME, COMPOSITION FOR SECONDARY BATTERY ELECTRODE FOR PRODUCING SAID SECONDARY BATTERY ELECTRODE, AND METHOD FOR PRODUCING SAID SECONDARY BATTERY ELECTRODE

(71) Applicant: LG CHEM, LTD., Seoul (KR)

(72) Inventor: Young Jae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 233 days.

(21) Appl. No.: 16/768,988

(22) PCT Filed: Dec. 7, 2018

(86) PCT No.: PCT/KR2018/015575
§ 371 (c)(1),
(2) Date: Jun. 2, 2020

(87) PCT Pub. No.: WO2019/112395
PCT Pub. Date: Jun. 13, 2019

(65) Prior Publication Data
US 2021/0226218 A1    Jul. 22, 2021

(30) Foreign Application Priority Data

Dec. 8, 2017    (KR) ........................ 10-2017-0168639
Dec. 7, 2018    (KR) ........................ 10-2018-0157151

(51) Int. Cl.
*H01M 4/62*    (2006.01)
*H01M 4/04*    (2006.01)
(Continued)

(52) U.S. Cl.
CPC ........... *H01M 4/622* (2013.01); *C08F 216/06* (2013.01); *C08F 220/06* (2013.01);
(Continued)

(58) Field of Classification Search
CPC ........... H01M 4/62; H01M 4/583; H01M 4/38; H01M 4/04
See application file for complete search history.

(56) References Cited

U.S. PATENT DOCUMENTS 6,048,637 A *   4/2000   Tsukahara .......... H01M 10/0567
                                                                                              429/57
6,573,004 B1    6/2003   Igarashi et al.
(Continued)

FOREIGN PATENT DOCUMENTS

CN    101237857 A    8/2008
CN    105027338 A    11/2015
(Continued)

OTHER PUBLICATIONS

Extended European Search Report for European Application No. 18885044.0, dated Nov. 30, 2020.
(Continued)

*Primary Examiner* — Kenneth J Douyette
(74) *Attorney, Agent, or Firm* — Birch, Stewart, Kolasch & Birch, LLP

(57) ABSTRACT

The present invention provides a binder for a secondary battery electrode, a secondary battery electrode and secondary battery including the same, a composition for a secondary battery electrode for producing the secondary battery electrode, and a method for producing the secondary battery electrode, wherein in the binder for a secondary battery electrode, a copolymer includes a polyvinyl alcohol-derived unit and an ionically substituted acrylate-derived unit, and is cross-linked to each other.

12 Claims, 2 Drawing Sheets

(51) Int. Cl.
   *H01M 4/38*        (2006.01)
   *H01M 4/58*        (2010.01)
   *C08F 216/06*      (2006.01)
   *C08F 220/06*      (2006.01)
   *H01M 4/583*       (2010.01)
   *H01M 10/0525*     (2010.01)

(52) U.S. Cl.
   CPC ....... *H01M 4/0404* (2013.01); *H01M 4/0471* (2013.01); *H01M 4/386* (2013.01); *H01M 4/583* (2013.01); *H01M 10/0525* (2013.01)

(56) References Cited

U.S. PATENT DOCUMENTS

| | | |
|---|---|---|
| 2006/0251582 A1 | 11/2006 | Reb |
| 2008/0274409 A1* | 11/2008 | Harada ................ D21H 17/56 429/247 |
| 2011/0039145 A1* | 2/2011 | Abe ................ H01M 50/403 429/247 |
| 2011/0166275 A1* | 7/2011 | Zhang ................ D04H 5/04 524/400 |
| 2012/0189552 A1 | 7/2012 | Reb |
| 2014/0314678 A1 | 10/2014 | Reb |
| 2014/0356710 A1 | 12/2014 | Chung et al. |
| 2015/0314020 A1 | 11/2015 | Reb |
| 2016/0028087 A1 | 1/2016 | Sonobe |
| 2018/0261844 A1 | 9/2018 | Kim et al. |
| 2018/0351177 A1 | 12/2018 | Kang et al. |

FOREIGN PATENT DOCUMENTS

| | | |
|---|---|---|
| JP | 11-250915 A | 9/1999 |
| KR | 10-2009-0110133 A | 10/2009 |
| KR | 10-2014-0139845 A | 12/2014 |
| KR | 10-2015-0131014 A | 11/2015 |
| KR | 10-1617668 B1 | 5/2016 |
| KR | 10-2017-0059899 A | 5/2017 |
| KR | 10-2017-0076592 A | 7/2017 |
| WO | WO 2018/012881 A1 | 1/2018 |

OTHER PUBLICATIONS

Shiga et al., "Pulsed NMR study of the structure of poly(vinyl alcohol)-poly(sodium acrylate) composite hydrogel," Journal of Polymer Science: Part B: Polymer Physics, vol. 32, No. 1, Jan. 15, 1994, pp. 85-90.
International Search Report (PCT/ISA/210) issued in PCT/KR2018/015575 dated Mar. 14, 2019.

* cited by examiner

BINDER FOR SECONDARY BATTERY ELECTRODE, SECONDARY BATTERY ELECTRODE AND SECONDARY BATTERY INCLUDING SAME, COMPOSITION FOR SECONDARY BATTERY ELECTRODE FOR PRODUCING SAID SECONDARY BATTERY ELECTRODE, AND METHOD FOR PRODUCING SAID SECONDARY BATTERY ELECTRODE

CROSS-REFERENCE TO RELATED APPLICATION

This application claims the benefit of Korean Patent Application No. 10-2017-0168639, filed on Dec. 8, 2017, and No. 10-2018-0157151, filed on Dec. 7, 2018, in the Korean Intellectual Property Office, the disclosures of which are expressly incorporated herein in their entireties by reference.

TECHNICAL FIELD

The present invention relates to: a binder for a secondary battery electrode including a copolymer which includes a polyvinyl alcohol-derived unit and an ionically substituted acrylate-derived unit, the copolymer being cross-linked; a secondary battery electrode and secondary battery including the same; a composition for a secondary battery electrode for producing the secondary battery electrode; and a method for producing the secondary battery electrode.

BACKGROUND ART

In recent years, with the technology development and demand increase for mobile devices, demand for batteries as an energy source has rapidly increased, and accordingly, various studies on batteries to meet the various demands have been conducted. Particularly, research on a lithium secondary battery having a high energy density and excellent life-time and cycle characteristics as a power source of the devices is being actively conducted.

A lithium secondary battery includes: a positive electrode including a positive electrode active material capable of intercalating/deintercalating lithium ions; a negative electrode including a negative electrode active material capable of intercalating/deintercalating lithium ions; and an electrode assembly, in which a microporous separator is interposed between the positive electrode and the negative electrode, including a non-aqueous electrolyte which contains lithium ions.

Lithium metal oxide is used as the positive electrode active material of the lithium secondary battery, and a lithium metal, a lithium alloy, crystalline or amorphous carbon, a carbon composite, silicon-based active material, etc. are used as the negative electrode active material. Among them, the silicon-based active material is used alone or in combination with other negative electrode active materials in order to improve capacity of the secondary battery.

However, there is a problem that a volume is excessively expanded as charging and discharging of the battery proceed when the silicon-based active material is used. Accordingly, separation between the electrode active materials or between the electrode active material and a current collector occurs due to the deformation of the electrode structure, so that the electrode active material is separated or the electrode active material is unable to fulfill a function. Furthermore, the electrode is deformed (e.g., a solid electrolyte interface (SEI) film is damaged) due to the volume change of the electrode during charging/discharging to cause lithium, which is contained in an electrolyte solution, to be consumed much more, thereby leading to deterioration of the electrode active material and battery due to the depletion of the electrolyte solution.

Binders, such as carboxymethylcellulose (CMC) and styrene butadiene rubber (SBR) have been conventionally used in order to suppress the electrode deformation due to the volume expansion. However, even when such binders are used, there are problems that the deformation of the electrode structure due to the volume expansion is unable to be effectively controlled, and a conductive path in the electrode is difficult to ensure, thereby increasing resistance.

Accordingly, a binder for a secondary battery electrode which may effectively suppress the deformation of the electrode structure even when the volume change of the silicon-based active material occurs as charging/discharging proceeds, and which may improve the conductivity of the electrode is required.

DISCLOSURE OF THE INVENTION

Technical Problem

An aspect of the present invention provides a binder for a secondary battery electrode which may effectively control a structural change in the electrode due to volume expansion of an electrode active material during charging and discharging and may improve conductivity of an electrode, a composition for a secondary battery electrode for producing the secondary battery electrode, and a method for producing the secondary battery electrode.

Technical Solution

According to an aspect of the present invention, there is provided a binder for a secondary battery electrode including a copolymer which includes a polyvinyl alcohol-derived unit and an ionically substituted acrylate-derived unit, the copolymer being cross-linked.

According to another aspect of the present invention, there is provided a composition for a secondary battery electrode, the composition including an electrode active material, a conductive material, a copolymer, a cross-linking agent, and a solvent, wherein the copolymer is the described copolymer.

According to another aspect of the present invention, there are provided: a secondary battery electrode including an active material layer which contains an electrode active material, a conductive material, and a binder; and a secondary battery including the same, wherein the binder is the described binder for a secondary battery electrode.

According to another aspect of the present invention, there is provided a method for producing a secondary battery electrode, the method including: applying the described composition for a secondary battery electrode onto a current collector and drying the composition; and heat treating the current collector coated with the composition.

Advantageous Effects

According to the present invention, a structural change in the electrode due to volume expansion of an electrode active material may be effectively controlled during charging and discharging, thereby improving efficiency of a secondary battery. In addition, conductivity of an electrode may be improved, thereby reducing electrode resistance and improving output of a battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
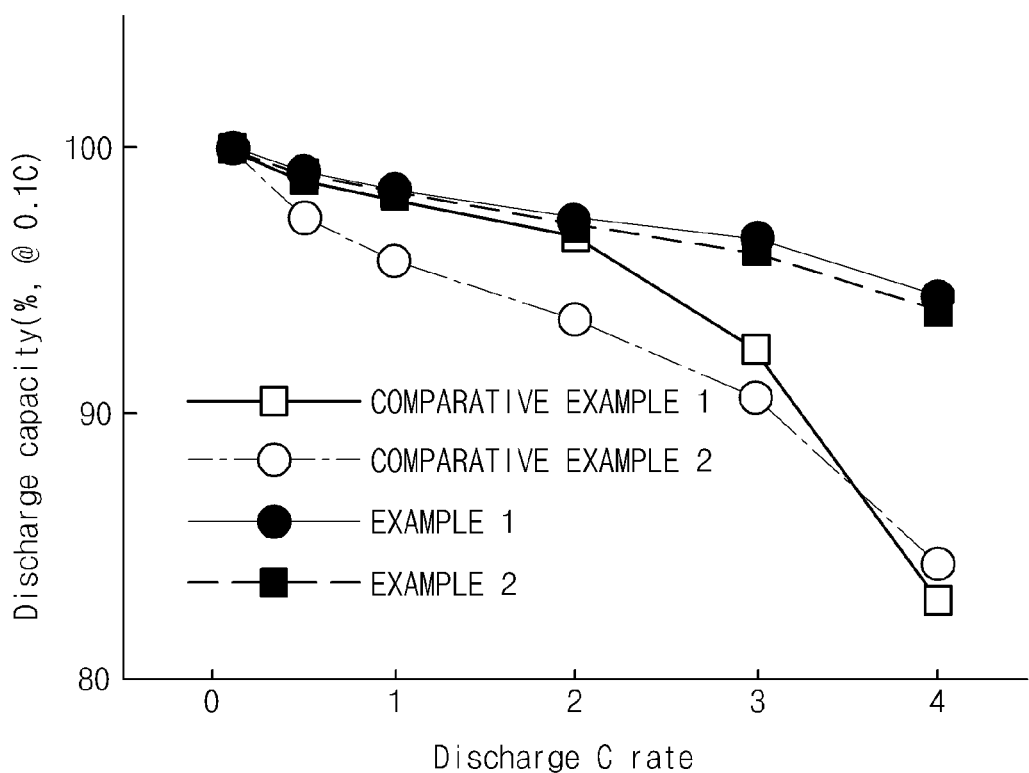
FIG. 1 is a graph showing measurement results of capacity depending on a discharge rate of secondary batteries manufactured according to Examples and Comparative Examples.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Binder for Secondary Battery Electrode>

One aspect of the present invention relates to a binder for a secondary battery electrode including a copolymer which includes a polyvinyl alcohol-derived unit and an ionically substituted acrylate-derived unit, the copolymer being cross-linked.

Conventionally, both aqueous and non-aqueous electrodes may be obtained when a negative electrode for a secondary battery is produced, and carboxymethylcellulose (CMC) and styrene butadiene rubber (SBR) are generally used as binders when the aqueous electrode is produced. Problems of cracking between particles and short-circuiting between electrodes occur due to a volume change of the electrode caused by charging and discharging of the battery, and particularly, negative electrode active materials (for example, materials forming intermetallic compounds with lithium, such as silicon, tin, and oxides thereof), which are recently used to ensure high capacity, cause deformation of a crystalline structure when lithium is absorbed and stored, thereby expanding the volume much more. Accordingly, conventional binders may not effectively suppress the deformation of the battery structure during charging/discharging, so that there are problems of deteriorating a battery and deteriorating life-time characteristics of a battery. In addition, when conventional binders are used, there also is a problem of reducing output of a battery because a conductive path in the electrode is difficult to ensure to increase electrode resistance.

On the other hand, a binder for a secondary battery electrode according to the present invention including a copolymer which includes a polyvinyl alcohol-derived unit and an ionically substituted acrylate-derived unit, the copolymer being cross-linked, has links (cross-links) connected by not only hydrogen bonding but also by ionic bonding. Accordingly, the binder may have high elasticity to have excellent resilience against the volume change of the electrode due to the volume expansion of the electrode active material. As a result, an initial efficiency of the manufactured secondary battery may be improved. In addition, since the binder for a secondary battery electrode may be located between chains connected by hydrogen bonding, a distance between hydroxy groups may be appropriately increased. Accordingly, a conductive path through which lithium ions move may be ensured, so that resistance of the produced electrode may be reduced and output of a secondary battery may be improved.

Specifically, the binder may ensure phase stability and adhesion even though it is, for instance, a single binder, thereby simplifying the manufacturing process, increasing a solid content of the electrode slurry, suppressing disconnection of the conductive path due to the volume expansion of the electrode active material, preventing the deformation of the electrode despite the volume change of the electrode by having the excellent adhesion, and ensuring the excellent charge/discharge life-time characteristics. Particularly, since the binder has an ionically substituted acrylate-derived unit, the adhesion may be remarkably improved as compared with the case where an ionically unsubstituted acrylate-derived unit is contained.

More specifically, when the binder is used, there may be following effects. When the electrode active material is expanded, in the case of carboxymethylcellulose (CMC) and styrene butadiene rubber (SBR) which are generally used as binders, CMC or SBR which has been adsorbed on the electrode active material is stretched instead of breaking, and is not recovered again. Accordingly, there is a problem that the conductive path or network between the electrode active materials is difficult to maintain. On the other hand, when the electrode active material is expanded, in the case of the copolymer, the binder is partially broken, and the remaining binder having a minimum amount with which resistance is sufficiently acted against the volume expansion is present in a state adsorbed on the electrode active material and serves to suppress the volume expansion of the electrode active material. Accordingly, the conductive path or network between the electrode active materials may also be maintained. Therefore, the life-time characteristics of a battery may be improved.

The ionically substituted acrylate-derived unit may be formed by copolymerizing alkyl acrylate with a monomer, and then, adding an excess amount of an ionic aqueous solution and performing substitution. In this case, in the final copolymer structure, the ionically substituted acrylate-derived unit may be understood as an acrylate-derived unit substituted by ionization based on the final ionically substituted polymer, irrespective of acrylate (e.g., alkyl acrylate) used as the raw material.

In the copolymer, a molar fraction of the ionically substituted acrylate-derived unit among all units of the copolymer, excluding the polyvinyl alcohol-derived unit, may be 98-100 mol %, specifically 100 mol %. The above-described "100 mol %" means that the ionically substituted acrylate-derived unit constitutes all of the units of the copolymer excluding the polyvinyl alcohol-derived unit, and also means that an unsubstituted acrylate-derived unit is non-existent. In other words, in such an instance, the copolymer contains no unsubstituted acrylate-derived units. The above-described "98 mol % or more" means that some ionically unsubstituted acrylate-derived units are present when all hydrogen in the acrylate-derived unit is intentionally ionized by performing the substitution process, and at this time, a content of the ionically unsubstituted acrylate-derived unit is only a very low level within an error range (e.g., less than 2 mol %).

The ionically unsubstituted acrylate-derived unit includes a hydroxyl group (—OH). When a large amount of the ionically unsubstituted acrylate-derived unit is contained in the copolymer, for example, when an amount of 2 mol % or more is contained, crystallization may proceed to a high level due to hydrogen bonding force after the electrode slurry is dried, and accordingly, the binder prepared by cross-linking of the copolymer may be excessively easily broken. Accordingly, the amount of the 'unbroken copolymer' which may suppress the volume expansion of the electrode active material may be remarkably reduced, and the copolymer adsorbed onto the electrode active material may be reduced. As a result, the adhesion between the active material layer and the current collector may be lowered, and the life-time characteristics of a battery may be deteriorated.

On the other hand, the copolymer used in the preparation of the binder of the present invention does not contain an ionically unsubstituted acrylate-derived unit or contains only a low content of less than 2 mol % (error range), and accordingly, a degree of the crystallization is lowered to an appropriate level by a metal cation substituting hydrogen. Accordingly, even when a portion of the binder is broken during the volume expansion of the electrode active material, the remaining binder is adsorbed to the electrode active material in a state of being not broken, thereby improving the adhesion between the active material layer and the current collector, and improving the life-time characteristics of a battery.

The molar fraction may be measured as follows. First, GC/MS analysis is performed on the powder-state copolymer by using EQC-0107 (Pyrolyzer (PY-2020/Agilent 6890N GC/5973N MSD)) to grasp an exact functional group. Thereafter, solid NMR (Agilent 600 MHz NMR) or solution NMR (Bruker 600 MHz NMR) is performed to confirm a content ratio of each composition from a peak integral value in a measured graph. Alternatively, after separating the active material layer from the produced electrode and forming it into a powder form, the molar fraction may be confirmed by performing the above-described method.

In the copolymer, the polyvinyl alcohol-derived unit may include a unit represented by Formula 1 below:

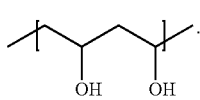

[Formula 1]

The ionically substituted acrylate-derived unit may include a unit represented by Formula 2 below:

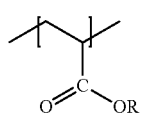

[Formula 2]

wherein R may be at least one metal cation selected from the group consisting of Na, Li, and K.

Furthermore, the copolymer may include 2000-3000 units of Formula 1, and may include 1000-2000 units of Formula 2.

The copolymer may be a block copolymer including a polyvinyl alcohol-derived unit and an ionically substituted acrylate-derived unit. That is, the copolymer may have a structure in which a block of a polyvinyl alcohol-derived unit and a block of an ionically substituted acrylate-derived unit are linearly connected, and constitute a main chain.

The polyvinyl alcohol-derived unit and the ionically substituted acrylate-derived unit may mean a structure in which a polyvinyl alcohol unit and an acrylate unit having a double bond, respectively, are formed by an addition reaction, and in the case of acrylate, in the final copolymer structure, a substituent bonded to ester and a substituent in a raw material may not necessarily be the same.

The ionically substituted acrylate-derived unit, more preferably, may be at least one selected from the group consisting of sodium acrylate and lithium acrylate, and most preferably, may be sodium acrylate.

The sodium acrylate and the lithium acrylate may be formed by copolymerizing alkyl acrylate with a monomer, and then, adding an excessive amount of a sodium ion solution or lithium ion solution and performing substitution. At this time, in the final copolymer structure, the acrylate-derived unit may be understood as a sodium acrylate-derived unit or a lithium acrylate-derived unit, irrespective of acrylate (e.g., alkyl acrylate) used as the raw material.

The copolymer may contain the polyvinyl alcohol-derived unit and the ionically substituted acrylate-derived unit at a weight ratio of 6:4 to 8:2. When the polyvinyl alcohol-derived unit and the ionically substituted acrylate-derived unit are contained at the described weight ratio, the polymer may be adsorbed onto particles due to the polyvinyl alcohol having a hydrophilic group to maintain appropriate dispersibility, and the adsorbed polymer is formed as a coating film after drying to exhibit stable adhesion. In addition, the formed coating film may be advantageous in improving battery performance by forming a uniform and dense SEI film during charging/discharging of a battery.

When the polyvinyl alcohol-derived unit is contained in an amount less than the described weight ratio range, the hydrophilic property may be weakened, and a solid content soluble in water may be reduced, so that the binder tends to come off from a surface of the electrode, which affects the performance, and although the polymer may be adsorbed onto a surface of the hydrophobic active material, there may be a problem of dispersion. On the other hand, when the polyvinyl alcohol-derived unit is contained in an amount larger than the described weight ratio range, a large amount of bubbles may be generated due to intrinsic properties of the PVA during dissolution or mixing, and particles are adsorbed onto the bubbles and aggregated to generate non-dispersed foam big size particles, thereby deteriorating cell performances and causing various problems.

The copolymer may have a weight average molecular weight of 100,000-500,000 g/mol. When the weight average molecular weight of the copolymer is less than 100,000, the dispersibility between the binders for a secondary battery electrode may be weakened, so that possibility of aggregation between the binders may be increased and it may be difficult to improve charge/discharge life-time characteristics. When the weight average molecular weight exceeds 500,000, it may be inappropriate to increase a solid content of the slurry because it may be difficult to be dissolved at a high concentration, and gelation may easily occur during polymerization.

The cross-linkage may be formed by an esterification reaction of the copolymer and a cross-linking agent. Specifically, —COOR in the copolymer and a cross-linking agent are bonded by an esterification reaction, more specifically, the cross-linking agent includes two or more glycidyl groups, and each glycidyl group is esterification reacted with —COOR in the copolymer to be bonded. Accordingly, the binder for a secondary battery electrode may include an ester structure (—COO—), and specifically, the ester structure may exist in a cross-linked chain between respective copolymers.

<Composition for Secondary Battery Electrode>

A composition for a secondary battery electrode according to an embodiment of the present invention may include an electrode active material, a conductive material, a copolymer, a cross-linking agent, and a solvent, wherein the copolymer is a copolymer which contains a polyvinyl alcohol-derived unit and an ionically substituted acrylate-derived unit, and is the same as the described copolymer. That is, all of the copolymers derived from the described embodiments may be applied as the copolymer included in the composition for a secondary battery electrode. In the copolymer, for example, the polyvinyl alcohol-derived unit may contain a unit represented by Formula 1 below:

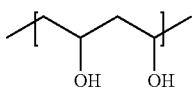

[Formula 1]

The ionically substituted acrylate-derived unit may include a unit represented by Formula 2 below:

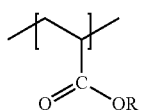

[Formula 2]

wherein R may be at least one metal cation selected from the group consisting of Na, Li, and K.

Furthermore, the copolymer may include 2000-3000 units of Formula 1 above, and may include 1000-2000 units of Formula 2 above.

The composition for a secondary battery electrode may preferably be used when a negative electrode is produced. As the electrode active material used in producing a negative electrode, a carbon-based material, a lithium metal, silicon, or tin, which conventionally enables occlusion and release of lithium ions, may be used. Preferably, a carbon-based material is mainly used, and the carbon-based material is not particularly limited, but may be at least one selected from the group consisting of, for example, soft carbon, hard carbon, natural graphite, artificial graphite, Kish graphite, pyrolytic carbon, mesophase pitch-based carbon fibers, mesocarbon microbeads, mesophase pitches, and petroleum or coal tar pitch derived cokes.

In addition, in order to achieve a higher capacity, the electrode active material may further include a Si-based material, for example, SiO, in addition to the carbon-based material.

The Si-based material may be contained in an amount of 5-30 wt % based on the total weight of the electrode active material. When the Si-based material is contained in an amount of less than 5 wt %, the high-capacity electrode may be difficult to be achieved because a capacity increase range according to an input ratio is not large. When the Si-based material is contained in an amount higher than 30 wt %, there may be a problem that volume expansion due to charging is too large to deform the electrode, and the life-time characteristics are remarkably deteriorated.

Although the Si-based material has a high-capacity, specifically, about 10 times higher theoretical capacity than the carbon-based material to achieve a battery having a high-capacity, deformation of a crystalline structure occurs during adsorbing and storing lithium which causes large volume expansion. Accordingly, there is a problem that, as charging/discharging proceed, such a volume change due to charging causes separation between the active materials and from a current collector, deformation of the electrode, etc., thereby deteriorating the life-time characteristics.

However, according to an embodiment of the present invention, excessive deformation of the electrode structure may be suppressed due to the binder for a secondary battery electrode in which a copolymer includes a polyvinyl alcohol-derived unit and an ionically substituted acrylate-derived unit, the copolymer being cross-linked to each other, and accordingly, the charge/discharge life-time characteristics may be improved.

The conductive material is not particularly limited as long as the conductive material is generally used in the art, for example, artificial graphite, natural graphite, carbon black, acetylene black, Ketjen black, denka black, thermal black, channel black, carbon fibers, metal fibers, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, a combination thereof, etc. may be applied, and generally, a carbon black-based conductive material may be frequently used.

The solvent may preferably include an aqueous solvent, and the aqueous solvent may be water. The binder according to an embodiment of the present invention may be water-soluble or water-dispersible. However, in some cases, the solvent may be at least one selected from among N,N-dimethylformamide, N,N-dimethylacetamide, methylethylketone, cyclohexanone, ethyl acetate, butyl acetate, cellosolve acetate, propylene glycol monomethyl ether acetate, methyl cellosolve, butyl cellosolve, methyl carbitol, butyl carbitol, propylene glycol monomethyl ether, diethylene glycol dimethyl ether, toluene, and xylene, or they may also be used by being mixed with water. A content of the solvent is not particularly limited, and may be used such that the slurry has appropriate viscosity.

In the binder according to an embodiment of the present invention, when the acrylate-derived unit is in a form of a salt, for example, sodium acrylate or lithium acrylate, a sodium or lithium cation may be present in a co-existing state of being dissociated or ionized when the binder is dissolved in the solvent.

The composition for a secondary battery electrode may further include an additive, in addition to the described components, for improving additional properties. Such an additive may be a conventionally used dispersant, thickener, filler, or the like. Each of such additives, in preparing the electrode composition, may be used by being pre-mixed with the composition for an electrode, or may be separately prepared and independently used. Ingredients of the additives to be used may be determined depending on ingredients of the electrode active material and the binder, and in some cases, the additives may not be used. Meanwhile, the electrode composition may be used by mixing the binder of the present invention together with the binders such as carboxymethyl cellulose (CMC) and styrene butadiene rubber (SBR) which have been conventionally used.

The cross-linking agent serves to cross-link the copolymers. The cross-linking agent may be bonded to —COOR in the copolymer by an esterification reaction. Specifically, the cross-linking agent may include two or more glycidyl groups, and a ring structure of each glycidyl group is opened by a specific heat treatment and is esterification reacted with —COOR in the copolymer to be bonded.

The cross-linking agent may include a diglycidyl ether-based cross-linking agent. Specifically, the diglycidyl ether-based cross-linking agent may be at least one selected from the group consisting of diglycidyl ether, bisphenol A diglycidyl ether, 1,4-butanediol diglycidyl ether, and ethylene glycol diglycidyl ether, and more specifically, may be diglycidyl ether.

A molecular weight of the cross-linking agent may be 300 g/mol to 1,000 g/mol, and specifically, may be 400 g/mol to 600 g/mol. When the molecular weight of the cross-linking agent is less than 300 g/mol, the volume expansion of the electrode may be difficult to be controlled because strength of the polymer is not sufficient. On the other hand, when the molecular weight exceeds 1,000 g/mol, dispersion of the cross-linking agent in the electrode composition may not smoothly occur because the cross-linking agent may exist in a solid phase. Accordingly, when the above range is satisfied, appropriate strength of the binder for an electrode and uniform dispersion of the cross-linking agent in the electrode composition may be achieved.

A weight ratio of the cross-linking agent to the copolymer may be 1:4 to 1:20, specifically 1:6.67 to 1:19, and more specifically 1:7.33 to 1:13.29. When the cross-linking agent is used more than the above range, adhesion of the binder in the produced electrode may be reduced, so that there may be a problem of deteriorating electrode performances. When the cross-linking agent is used less than the above range, cross-linking of the copolymers may not be sufficiently formed.

The composition for an electrode according to an embodiment of the present invention may contain the copolymer in an amount of 1.8-3.3 wt % with respect to the total weight of the solids excluding the solvent. When the above range is satisfied, the adhesion of the binder is sufficient and the electrode resistance may be at an appropriate level.

<Secondary Battery Electrode>

A secondary battery electrode of the present invention may include an active material layer containing an electrode active material, a conductive material, and a binder, wherein the binder is the same as the binder for a secondary battery electrode described above. Furthermore, the electrode active material and the conductive material are the same as the electrode active material and the conductive material which may be included in the composition for a secondary battery electrode described above.

The electrode active material may include any one or more carbon-based materials selected from the group consisting of, for example, soft carbon, hard carbon, natural graphite, artificial graphite, Kish graphite, pyrolytic carbon, mesophase pitch-based carbon fibers, mesocarbon microbeads, mesophase pitches, and petroleum or coal tar pitch derived cokes. In addition, the electrode active material may further include a Si-based material, and specifically, the Si-based material may be contained in an amount of 5-30 wt % based on the total weight of the electrode active material.

The secondary battery electrode may be a positive electrode or a negative electrode, and preferably may be a negative electrode.

The binder may be contained in an amount of 2-3.7 wt % based on the total weight of the active material layer, specifically 2.5-3.4 wt %, and more specifically 2.8-3.2 wt %. When the above range is satisfied, viscosity of the composition for an electrode is appropriate, and accordingly, a manufacturing process may be smooth. The binder adhesion may also be sufficient, thereby improving physical properties of an electrode.

<Method for Producing Secondary Battery Electrode>

The method for producing a secondary battery electrode of the present invention may include: applying the described composition for a secondary battery electrode onto a current collector and drying the composition; and heat treating the current collector coated with the composition. Preferably, the method for producing a secondary battery electrode may be applied to production of a negative electrode.

The current collector may use any metal which has high conductivity and onto which the composition for a secondary battery electrode may easily adhere as long as the metal is not reactive in a voltage range of a battery. The current collector may be a positive electrode current collector or a negative electrode current collector. Nonlimiting examples of the positive electrode current collector may be aluminum, nickel, or foil made of a combination thereof, and nonlimiting examples of the negative electrode current collector may be copper, gold, nickel, a copper alloy, or foil made of a combination thereof.

In the step for applying the composition for a secondary battery electrode onto a current collector and drying the composition, the drying may be performed to remove a solvent in the composition for a secondary battery electrode.

In the step for heat treating the current collector coated with the composition, the heat treating corresponds to a process for a cross-linking reaction. The heat treating may be performed at 90-120° C., and a specific temperature range may be 100-120° C., more specifically 110-120° C. When the heat treatment temperature is lower than 90° C., a cross-linking reaction between copolymers in the composition for an electrode may not occur smoothly. When the temperature exceeds 120° C., flexibility of an electrode may be reduced, thereby deteriorating mechanical stability.

<Secondary Battery>

The present invention relates to a lithium secondary battery including a positive electrode, a negative electrode, an electrolyte solution, and a separator, wherein the negative electrode is the same as the electrode for a secondary battery electrode according to the present invention.

The lithium secondary battery of the present invention may be manufactured by a conventional method known in the art. For example, the lithium secondary battery may be manufactured by disposing a separator between a positive electrode and a negative electrode, and then, adding an electrolyte solution in which a lithium salt is dissolved.

The positive electrode may include a positive electrode active material. The positive electrode active material may preferably use lithium-transition metal oxide, and may use one or more mixtures selected from the group consisting of, for example, $Li_{x1}CoO_2$ ($0.5<x1<1.3$), $Li_{x2}NiO_2$ ($0.5<x2<1.3$), $Li_{x3}MnO_2$ ($0.5<x3<1.3$), $Li_{x4}Mn_2O_4$ ($0.5<x4<1.3$), $Li_{x5}(Ni_{a1}Co_{b1}Mn_{c1})O_2$ ($0.5<x5<1.3$, $0<a1<1$, $0<b1<1$, $0<c1<1$, and $a1+b1+c1=1$), $Li_{x6}Ni_{1-y1}Co_{y1}O_2$ ($0.5<x6<1.3$ and $0<y<1$), $Li_{x7}CO_{1-y2}Mn_{y2}O_2$ ($0.5<x7<1.3$ and $0≤y2<1$), $Li_{x8}Ni_{1-y3}Mn_{y3}O_2$ ($0.5<x8<1.3$ and $0≤y3<1$), $Li_{x9}(Ni_{a2}Co_{b2}Mn_{c2})O_4$ ($0.5<x9<1.3$, $0<a2<2$, $0<b2<2$, $0<c2<2$ and $a2+b2+c2=2$), $Li_{x10}Mn_{2-z1}Ni_{z1}O_4$ ($0.5<x10<1.3$ and $0<z1<2$), $Li_{x11}Mn_{2-z2}Co_{z2}O_4$ ($0.5<x11<1.3$ and $0<z2<2$), $Li_{x12}CoPO_4$ ($0.5<x12<1.3$), and $Li_{x13}FePO_4$ ($0.5<x13<1.3$).

The negative electrode may include a negative electrode active material. The negative electrode active material may use a carbon-based material, a lithium metal, silicon, or tin, which conventionally enables occlusion and release of lithium ions, as described in the composition for an electrode of the present invention. Preferably, the carbon-based material may be mainly used, and the carbon-based material may further include a Si-based material. The negative electrode active material may be the same as the electrode active material included in the composition for a secondary battery electrode of the present invention.

The separator included in the lithium secondary battery according to the present invention may use a conventional porous polymer film, and for example, a porous polymer film made of a polyolefin-based polymer such as an ethylene homopolymer, a propylene homopolymer, an ethylene/butene copolymer, an ethylene/hexene copolymer, an ethylene/methacrylate copolymer, etc. may be used alone or in a laminated form thereof, or a conventional porous nonwoven fabric, for example, a nonwoven fabric made of a glass fiber having a high melting point, a polyethylene terephthalate fiber, etc. may be used, but the embodiment is not limited thereto.

The electrolyte solution included in the lithium secondary battery according to the present invention may be one or more mixed organic solvents selected from the group consisting of propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, ethyl propionate, and butyl propionate.

In addition, the electrolyte solution according to the present invention may further include a lithium salt, and an anion of the lithium salt may be at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C—$, $CF_3(CF_2)_7SO_3^-$, $CF_3CO_2^-$, $CH_3CO_2^-$, $SCN^-$, and $(CF_3CF_2SO_2)_2N^-$.

The lithium secondary battery according to the present invention may be a cylindrical-, square-, or pouch-type secondary battery, but the embodiment is not limited thereto as long as a charge/discharge device.

According to another aspect of the present invention, there are also provided: a battery module including the secondary battery as a unit cell; and a battery pack including the same.

The battery pack may be used as one or more power sources of a medium- or large-sized device selected from the group consisting of a power tool; electric vehicles including an electric vehicle (EV), a hybrid electric vehicle (HEV), or a plug-in hybrid electric vehicle (PHEV); and a power storage system.

Hereinafter, the present invention will be described in more detail according to examples. However, the invention may be embodied in many different forms and should not be construed as being limited to the embodiments set forth herein.

Preparation Example: Preparation of Copolymer 26.7 g of methyl acrylate and 53.3 g of poly(vinylalcohol) were dissolved in 320 g of benzene and stirred in a 1 L reaction container equipped with a heater, a condenser, and a stirrer. 2.256 g of benzoyl peroxide was added as an initiator and 16.8 g of 1-butanethiol was added as a chain transfer reactant. Temperature was raised to 110° C. in a nitrogen atmosphere. After a reaction time of 4 hours, the initiator and the monomer were washed with methanol, and the resulting powder was stirred in an excessive amount of n-hexane. An excessive amount of 5N NaOH solution was added into the solution being stirred, and then, the methyl in the methyl acrylate was substituted with a Na ion by stirring for 2 hours. After the reaction, the mixture was sedimented to obtain a powder, and then, the obtained powder was dried in an oven at 60° C. to obtain a final synthesized copolymer.

The weight average molecular weight of the prepared copolymer was 360,000, and the weight ratio of the poly (vinylalcohol)-derived unit and the sodium acrylate-derived unit was 6.7:3.3.

In the copolymer, the molar fraction of the ionically substituted acrylate-derived unit among the units excluding the polyvinyl alcohol-derived unit was 100 mol %.

The molar fraction was measured as follows. First, GC/MS analysis was performed on the powder-state copolymer by using EQC-0107 (Pyrolyzer (PY-2020/Agilent 6890N GC/5973N MSD) to grasp an exact functional group. Thereafter, solid NMR (Agilent 600 MHz NMR) or solution NMR (Bruker 600 MHz NMR) was performed, and the content ratio of each composition was confirmed from the peak integral value in the measured graph. As a result, the molar fraction of the ionically substituted acrylate-derived unit was confirmed.

Example 1: Manufacture of Composition for Secondary Battery Electrode, Binder for Secondary Battery Electrode, Secondary Battery Electrode, and Secondary Battery (1) Preparation of Composition for Secondary Battery Electrode 4.21 g of the copolymer prepared in Preparation Example was added to 79.99 g of water, and mixed at 70° C. and 1500 rpm by using a homomixer for 180 minutes to prepare 5.0 wt % copolymer dispersion solution in which the copolymer was dispersed. 1.25 g of a carbon black-based conductive material and 70.8 g of water were added to 12.21 g of the dispersion solution, and the mixture was dispersed by using a homomixer. 150.0 g of artificial graphite (negative electrode active material) having 20 μm was added to the dispersed solution, and mixed at 45 rpm by using a planetary mixer for 40 minutes. Thereafter, 0.47 g of diglycidyl ether (molecular weight: 500 g/mol), which is a cross-linking agent, was added to the mixed solution, and mixed at 45 rpm by using a planetary mixer for 40 minutes to prepare a slurry. 71.99 g of the remaining copolymer solution and 46.6 g of water were added to the slurry, and mixed again at 45 rpm by using a planetary mixer for 40 minutes to prepare a composition for a secondary battery electrode. This prepared composition for a secondary battery electrode was a mixed solution (solid content of 47.89 wt %) in which the negative electrode active material, the conductive material, the copolymer, and the cross-linking agent were mixed at a weight ratio of 96.2:0.8:2.7:0.3.

(2) Production of Binder for Secondary Battery Electrode and Secondary Battery Electrode The prepared composition (slurry) for a secondary battery electrode was applied onto a negative electrode current collector having a thickness of 20 μm such that the electrode loading (mg/cm$^2$) was 5.87 mg per unit area, and dried in a vacuum oven at 70° C. for 10 hours. Thereafter, the temperature of the vacuum oven was raised to 120° C., and heat treatment was performed for 1 hour. Accordingly, a binder for a secondary battery electrode was produced in the dried slurry.

Thereafter, the current collector coated with the slurry was rolled under a pressure of 15 MPa between rolls heated to 50° C. to produce a negative electrode (secondary battery electrode) having a final thickness (current collector and active material layer) of 58.6 μm, wherein the loading amount of the active material layer is 146.7 mg/25 cm$^2$.

(3) Manufacture of Secondary Battery

The positive electrode active material NMC, the carbon black-based conductive material, and the binder PVDF powder were mixed at a weight ratio of 92:2:6, respectively, in a solvent N-methyl-2-pyrrolidone to prepare a positive electrode slurry.

The prepared positive electrode slurry was applied onto a positive electrode current collector having a thickness of 15 μm such that the electrode loading (mg/cm$^2$) was 23.4 mg per unit area, and dried in a vacuum oven at 120° C. for 10 hours, and then, the current collector coated with the slurry was rolled under a pressure of 15 MPa between rolls heated to 80° C. to produce a positive electrode having a final thickness (current collector and active material layer) of 74.0 μm.

The produced negative electrode and positive electrode, and a porous polyethylene separator were assembled by using a stacking method, and an electrolyte solution (ethylene carbonate (EC)/ethylmethyl carbonate (EMC)=1/2 (volume ratio) and lithiumhexafluorophosphate (LiPF$_6$: 1 mole)) was injected into the assembled battery to manufacture a lithium secondary battery.

Example 2: Manufacture of Composition for Secondary Battery Electrode, Binder for Secondary Battery Electrode, Secondary Battery Electrode, and Secondary Battery (1) Preparation of Composition for Secondary Battery Electrode A composition for a secondary battery electrode was prepared in the same manner as in Example 1 except that the total amount of 94.35 g of the copolymer dispersion solution (3.74 g of total copolymer) and 0.94 g of the cross-linking agent were added. The prepared composition for a secondary battery electrode was a mixed solution (solid content of 48.0 wt %) in which the negative electrode active material, the conductive material, the copolymer, and the cross-linking agent were mixed at a weight ratio of 96.2:0.8:2.4:0.6.

(2) Production of Binder for Secondary Battery Electrode, Secondary Battery Electrode, and Secondary Battery A binder for a secondary battery electrode, a secondary battery electrode, and a secondary battery were prepared in the same manner as in Example 1 except that the composition for a secondary battery electrode prepared above was used. The final thickness (current collector and active material layer) of the secondary battery electrode was 59.6 μm, wherein the loading amount of the active material layer was 153.5 mg/25 cm$^2$.

Comparative Example 1

4.68 g of the copolymer prepared in Preparation Example was added to 93.56 g of water, and mixed at 70° C. and 1500 rpm by using a homomixer for 180 minutes to prepare 5.0 wt % copolymer dispersion solution in which the copolymer was dispersed. 1.25 g of a carbon black-based conductive material and 70.8 g of water were added to 13.57 g of the dispersion solution, and the mixture was dispersed by using a homomixer. 150.0 g of artificial graphite (negative electrode active material) having 20 μm was added to the dispersed solution, and mixed at 45 rpm by using a planetary mixer for 40 minutes to prepare a slurry. 79.99 g of the remaining copolymer solution and 38.8 g of water were added to the slurry, and mixed again at 45 rpm by using a planetary mixer for 40 minutes to prepare a composition for a secondary battery electrode. This prepared composition for a secondary battery electrode was a mixed solution (solid content of 47.9 wt %) in which the negative electrode active material, the conductive material, and the copolymer were mixed at a weight ratio of 96.2:0.8:3.0.

The prepared composition (slurry) for a secondary battery electrode was applied onto a negative electrode current collector having a thickness of 20 μm such that the electrode loading (mg/cm$^2$) was 5.76 mg per unit area, and dried in a vacuum oven at 70° C. for 10 hours, and thereafter, the current collector coated with the slurry was rolled under a pressure of 15 MPa between rolls heated to 50° C. to produce a negative electrode (secondary battery electrode) having a final thickness (current collector and active material layer) of 57.1 μm, wherein the loading amount of the active material layer is 144.0 mg/25 cm$^2$.

Comparative Example 2

1.56 g of carboxymethylcellulose (CMC, molecular weight of 1,200,000) was added to 140.19 g of water, and mixed at 40° C. and 1500 rpm by using a homomixer for 180 minutes to prepare 1.1 wt % CMC dispersion solution in which CMC was dispersed. 1.25 g of a carbon black-based conductive material and 27.00 g of water were added to 57.27 g of the dispersion solution, and the mixture was dispersed by using a homomixer. 150.0 g of artificial graphite (negative electrode active material) having 20 μm was added to the dispersed solution, and mixed at 45 rpm by using a planetary mixer for 40 minutes to prepare a slurry. 84.48 g of the remaining CMC dispersion solution, 26.65 g of water, and 7.72 g of SBR dispersion solution (SBR added amount of 3.12 g, solid content of 40.4 wt %) were added to the slurry, and mixed again at 45 rpm by using a planetary mixer for 40 minutes to prepare a composition for a secondary battery electrode. This prepared composition for a secondary battery electrode was a mixed solution (solid content of 44.00 wt %) in which the negative electrode active material, the conductive material, CMC, SBR were mixed at a weight ratio of 96.2:0.8:1.0:2.0.

The prepared composition (slurry) for a secondary battery electrode was applied onto a negative electrode current collector having a thickness of 20 μm such that the electrode loading (mg/cm$^2$) was 5.89 mg per unit area, and dried in a vacuum oven at 70° C. for 10 hours, and thereafter, the current collector coated with the slurry was rolled under a pressure of 15 MPa between rolls heated to 50° C. to produce a negative electrode (secondary battery electrode) having a final thickness (current collector and active material layer) of 57.7 μm, wherein the loading amount of the active material layer is 147.1 mg/25 cm².

Experimental Example 1: Evaluation of Discharge Capacity Depending on Discharge C-Rate The results of evaluating the lithium secondary batteries manufactured in Examples 1 and 2 and Comparative Examples 1 and 2 by discharge C-Rate are shown in FIG. 1. During this time, the charge C-Rate was fixed at 0.1 C, and the discharge capacity was measured while increasing the discharge C-Rate.

As a result, it was confirmed that the discharge capacity by discharge C-Rate in Examples 1 and 2 is significantly less reduced than that in Comparative Examples 1 and 2.

Experimental Example 2: Evaluation of Fully-Charged Electrode Thickness

Figure 2:
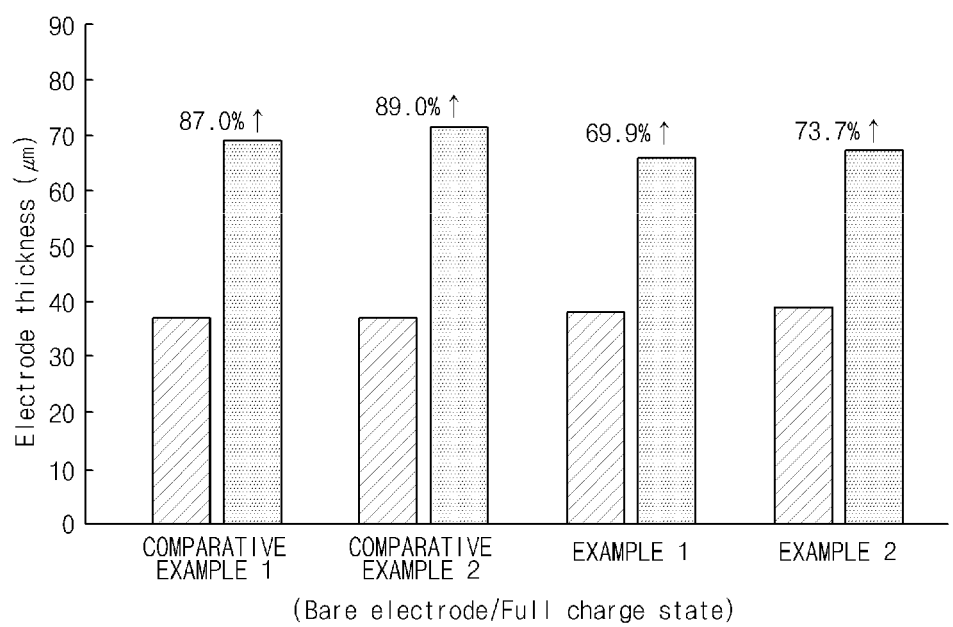
FIG. 2 is a graph showing changes in electrode thickness of secondary batteries manufactured according to Examples and Comparative Examples.

The lithium secondary batteries manufactured in Examples 1 and 2 and Comparative Examples 1 and 2 were charged at a constant current (CC) of 1 C under a constant current/constant voltage (CC/CV) condition (battery capacity of 3.4 mAh), and then, charged until the charging current reached 0.17 mAh, and thereafter, discharged at a constant current of 1 C until the voltage reached 1.5 V, and this charging/discharging was performed by 30 cycles. Thereafter, the battery in a fully-charged state was disassembled to measure the thickness of the negative electrode, and the electrode thickness increase rate as compared with the initial thickness before performing the cycle is shown in Table 1 and FIG. 2.

TABLE 1

|  | Comparative Example 1 | Comparative Example 2 | Example 1 | Example 2 |
| --- | --- | --- | --- | --- |
| Electrode thickness increase rate (%) | 87.0 | 89.0 | 69.9 | 73.7 |

The electrode thickness increase rate was calculated as follows:

Electrode thickness increase rate=100×(negative electrode thickness in fully-charged state after 30 cycles−initial negative electrode thickness)/initial negative electrode thickness As a result, it was confirmed that the electrode thickness variations in Examples 1 and 2 are smaller than those in Comparative Examples 1 and 2.

The invention claimed is:

1. A binder for a secondary battery electrode, comprising: a copolymer, which comprises a polyvinyl alcohol-derived unit and an ionically substituted acrylate-derived unit, the copolymer being cross-linked, wherein —COOR groups present in the copolymer and a cross-linking agent are bonded by an esterification reaction.

2. The binder for the secondary battery electrode of claim 1, wherein the polyvinyl alcohol-derived unit comprises a unit represented by Formula 1 below:

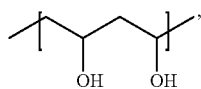

[Formula 1]

and
the ionically substituted acrylate-derived unit comprises a unit represented by Formula 2 below:

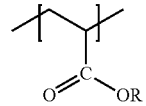

[Formula 2]

wherein R is at least one metal cation selected from the group consisting of Na, Li, and K.

3. The binder for the secondary battery electrode of claim 2, wherein the copolymer comprises 2000-3000 units of Formula 1, and comprises 1000-2000 units of Formula 2.

4. The binder for the secondary battery electrode of claim 1, wherein the copolymer comprises the polyvinyl alcohol-derived unit and the ionically substituted acrylate-derived unit at a weight ratio of 6:4 to 8:2.

5. The binder for the secondary battery electrode of claim 1, wherein the ionically substituted acrylate is at least one of a salt selected from the group consisting of sodium acrylate and lithium acrylate.

6. The binder for the secondary battery electrode of claim 1, wherein the copolymer is a block copolymer comprising the polyvinyl alcohol-derived unit and the ionically substituted acrylate-derived unit.

7. The binder for the secondary battery electrode of claim 1, wherein the copolymer has a weight average molecular weight of 100,000 Da to 500,000 Da.

8. The binder for the secondary battery electrode of claim 1, wherein the binder comprises an ester.

9. The binder for the secondary battery electrode of claim 1, wherein in the copolymer, a molar fraction of the ionically substituted acrylate-derived unit among all units, excluding the polyvinyl alcohol-derived unit, is 98 mol % to 100 mol %.

10. A secondary battery electrode comprising:
an electrode active material;
a conductive material; and
the binder according to claim 1.

11. The secondary battery electrode of claim 10, wherein the electrode active material further comprises a Si-based material.

12. A secondary battery comprising:
a positive electrode;
a negative electrode according to claim 10;
a separator interposed between the positive electrode and negative electrode; and
an electrolyte solution.

* * * * *